(12) United States Patent
Gazit et al.

(10) Patent No.: US 8,724,722 B2
(45) Date of Patent: May 13, 2014

(54) METHOD FOR REDUCING LATENCY ON LTE DL IMPLEMENTATION

(75) Inventors: Ido Gazit, Haifa (IL); Shai Kalfon, Hod Hasharon (IL); Sharon Rosenschein, Yavne (IL)

(73) Assignee: LSI Corporation, San Jose, CA (US)

( * ) Notice: Subject to any disclaimer, the term of this patent is extended or adjusted under 35 U.S.C. 154(b) by 29 days.

(21) Appl. No.: 13/086,737

(22) Filed: Apr. 14, 2011

(65) Prior Publication Data

US 2012/0263246 A1    Oct. 18, 2012

(51) Int. Cl.
*H04K 1/10*    (2006.01)
*H04L 27/28*   (2006.01)

(52) U.S. Cl.
USPC ............ 375/260; 370/203; 370/208; 370/210

(58) Field of Classification Search
USPC ................. 375/260, 267, 299; 370/203–211
See application file for complete search history.

(56) References Cited

U.S. PATENT DOCUMENTS

| 7,813,262 | B1 | 10/2010 | Rao | 370/208 |
| 2004/0160892 | A1* | 8/2004 | Agrawalla et al. | 370/203 |
| 2006/0164973 | A1* | 7/2006 | Lee et al. | 370/208 |
| 2010/0080154 | A1 | 4/2010 | Noh et al. | 370/310 |
| 2010/0220806 | A1 | 9/2010 | Imamura et al. | 375/295 |
| 2010/0246712 | A1 | 9/2010 | Suo et al. | 375/295 |
| 2010/0265999 | A1* | 10/2010 | Stern et al. | 375/219 |
| 2010/0290557 | A1 | 11/2010 | Lee et al. | 375/295 |
| 2010/0296385 | A1 | 11/2010 | Li | 370/210 |
| 2011/0007673 | A1* | 1/2011 | Ahn et al. | 370/280 |
| 2011/0019768 | A1 | 1/2011 | Nammi et al. | 375/295 |
| 2011/0051824 | A1 | 3/2011 | Kim et al. | 375/259 |
| 2011/0164549 | A1* | 7/2011 | Huang et al. | 370/312 |
| 2011/0206014 | A1* | 8/2011 | Lee et al. | 370/335 |

* cited by examiner

*Primary Examiner* — Curtis Odom
(74) *Attorney, Agent, or Firm* — Christopher P. Maiorana, PC

(57) ABSTRACT

An apparatus including a processor and a radio frequency (RF) interface. The processor may be configured to process downlink information such that a latency of the apparatus is determined by an amount of time involved in processing the downlink information to obtain a single orthogonal frequency division multiplexed (OFDM) symbol for presentation to the RF interface.

17 Claims, 5 Drawing Sheets

US 8,724,722 B2

METHOD FOR REDUCING LATENCY ON LTE DL IMPLEMENTATION

FIELD OF THE INVENTION

The present invention relates to wireless communication generally and, more particularly, to a method and/or apparatus for reducing latency on LTE DL implementation.

BACKGROUND OF THE INVENTION

In a cellular system implementing a third generation mobile network technology compliant with the 3GPP Long Term Evolution (LTE) standard, high bit rate and latency are very restricted when compared to previous standards. The high bit rate and latency restrictions pose many challenges to developers of an LTE compliant system. In order to meet latency requirements, processing needs to be fast. For fast processing, powerful processors are needed, which increases the project budget. The powerful processors also increase power consumption. An LTE downlink (DL) has a maximum bit rate of 300 Mbps for Release-8 and Release-9 and 600 Mbps for Release-10 (LTE-ADVANCED) for a bandwidth of 20 MHz. The bit rate can be split among several mobile units (referred to as user equipment or UEs).

Referring to FIG. 1, a flow diagram 10 is shown illustrating a main function 10 of a downlink (DL) layer 1 (L1) processing scheme. The function 10 provides input to a radio frequency (RF) interface. The function 10 performs a cyclic redundancy check (CRC) process 12, a turbo coding process 14, a sub-block interleaving and rate matching process 16, a scrambling process 18, a modulation process 20, a layer mapping and precoding process 22, a resource block (RB) mapping process 24, and an inverse fast Fourier transform (IFFT) calculation process 26. The resource block mapping process 24 produces a resource grid 28. The resource grid 28 contains orthogonal frequency division multiplexed (OFDM) symbols 30. One OFDM symbol 30 is one column in the resource grid 28. The resource grid 28 contains a total of 14 columns in the case of a normal cyclic prefix (CP).

According to the 3GPP LTE standard (see section 6.4 of the 3rd Generation Partnership Project; Technical Specification Group Radio Access Network; Evolved Universal Terrestrial Radio Access (E-UTRA); Physical Channels and Modulation (Release 10), document 3GPP TS 36.211 v10.1.0) all of the processing including the resource block mapping process 24 is to be completed before the inverse fast Fourier transform (IFFT) calculation process 26 is started. According to the standard, the resource block mapping process 24 shall be completed for all UEs until the resource grid 28 is full. Only when the resource grid 28 is full can the IFFT calculation process 26 be performed on the OFDM symbols 30. The latency for the downlink data processing is measured from the generation of the CRC bit by the CRC process 12 until the first OFDM symbol 30 is ready for presentation to the RF interface (i.e., the inverse fast Fourier transform (IFFT) calculation process 26 has been performed on the first OFDM symbol). Implementation according to the 3GPP LTE standard requires a lot of processing for the first OFDM symbol to be ready for the RF interface, because all the processing for all of the UEs needs to be completely finished before starting the inverse fast Fourier transform (IFFT) calculation process 26.

It would be desirable to implement a method for reducing latency on LTE DL implementation.

SUMMARY OF THE INVENTION

The present invention concerns an apparatus including a processor and a radio frequency (RF) interface. The processor may be configured to process downlink information such that a latency of the apparatus is determined by an amount of time involved in processing the downlink information to obtain a single orthogonal frequency division multiplexed (OFDM) symbol for presentation to the RF interface.

The objects, features and advantages of the present invention include providing a method for implementation of an LTE DL with reduced latency that may (i) be implemented similarly for single and multi-user systems, (ii) minimize an amount of time taken to prepare a first OFDM symbol for presentation to an RF interface, and/or (iii) allow implementation of an LTE downlink with reduced processing power and power consumption.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 2:
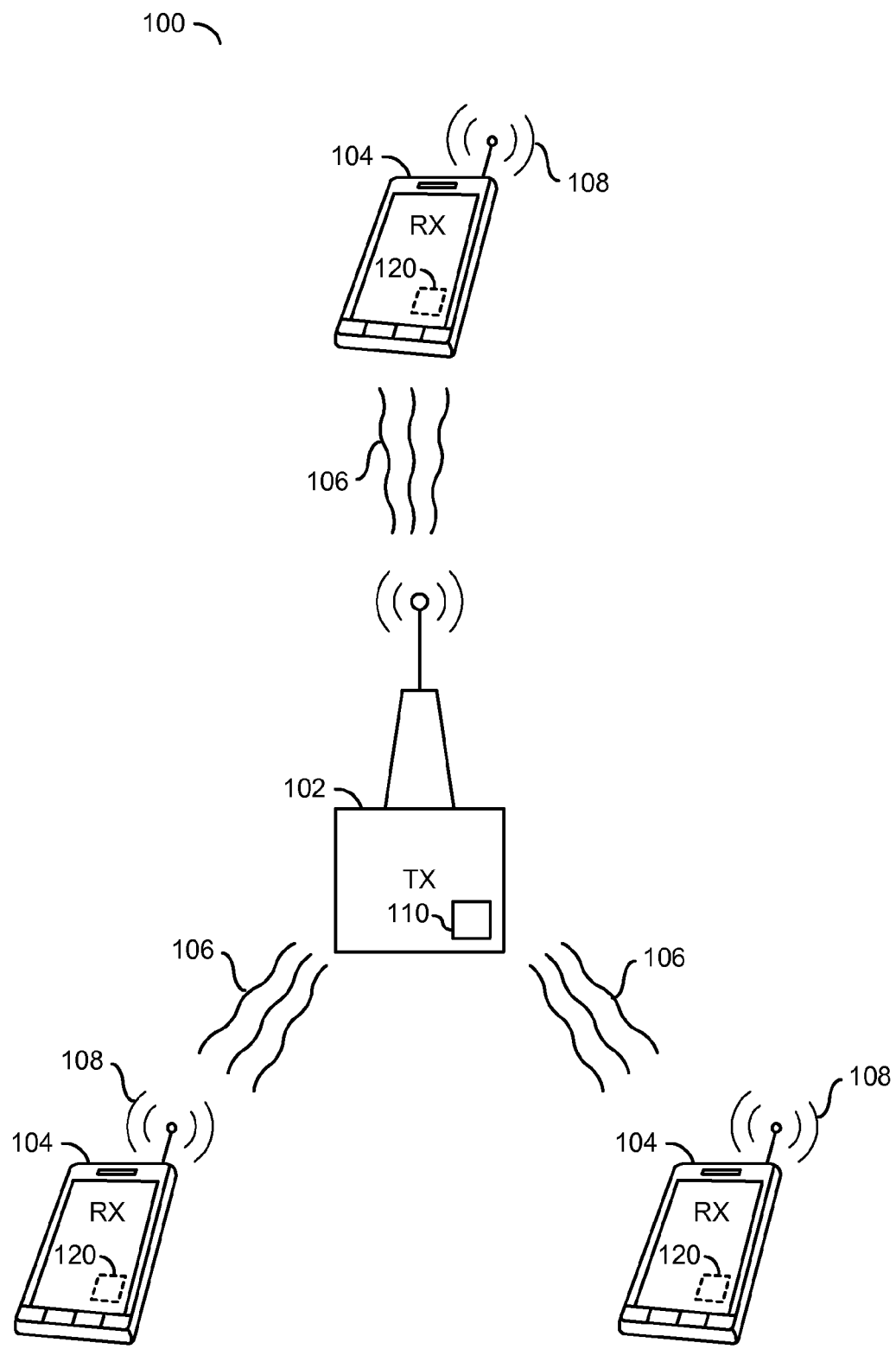
FIG. 2 is a diagram illustrating a system in which an embodiment of the present invention may be implemented.

Referring to FIG. 2, a diagram of a system 100 is shown illustrating a communications system implemented in accordance with an example embodiment of the present invention. The system 100 may implement a wireless communications system. In one example, the system 100 may implement a third generation cellular communication system compliant with the 3GPP Long Term Evolution (LTE) standard. The system 100 generally comprises at least one base station 102 and a number of mobile units 104. The base station 102 may transmit signals to the mobile units 104 via a downlink channel 106. Each of the mobile units 104 may transmit signals to the base stations 102 via an uplink channel 108. The system 100 may also be implemented with multiple base stations 102. The base station(s) 102 may include a processing unit 110. Each of the mobile units 104 may include a processing unit 120. The processing units 110 and 120 may be configured to manage communications between the base station(s) 102 and the mobile units 104.

The processing unit 110 may be configured to perform an iterative downlink process for resource elements mapping on a pipe of orthogonal frequency division multiplexed (OFDM) symbols. In one example, the processor 110 may implement hardware to perform the downlink processing in accordance with the present invention. In another example, the downlink processing in accordance with the present invention may be performed by software executed on the processing unit 110. In one example, the software for performing the downlink processing in accordance with the present invention may be written to a Flash memory or other nonvolatile memory (e.g., programmable read only memory (PROM), erasable programmable read only memory (EPROM), electrically erasable programmable read only memory (EEPROM), bubble memory, disk or disc media, etc.). Additionally, even volatile memory, such as dynamic random access memory (DRAM) or static random access memory (SRAM), may be used. For example, the software may be loaded from a non-volatile storage medium at power-up.

Figure 3:
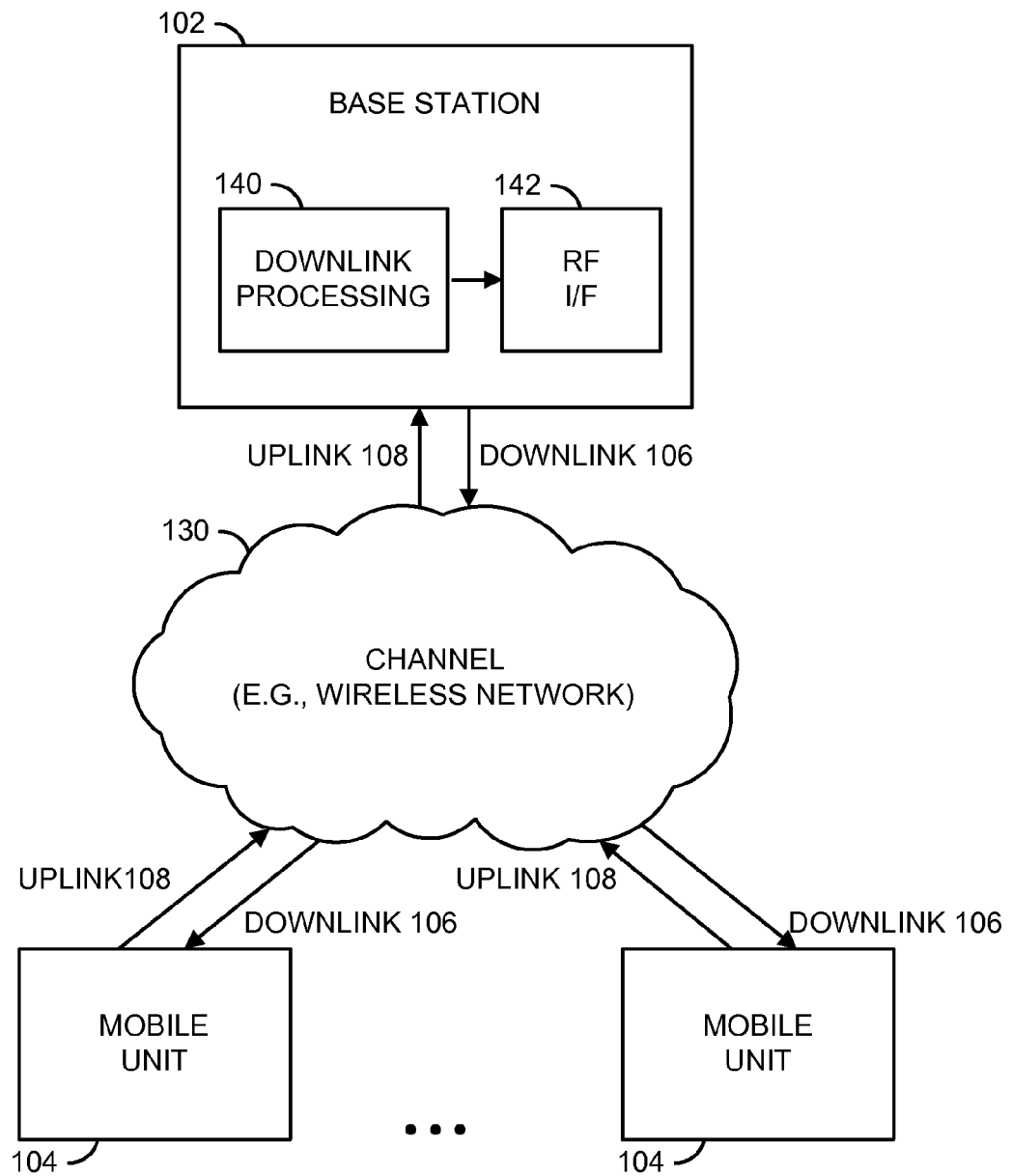
FIG. 3 is a diagram illustrating example components employed in processing a downlink channel in accordance with an embodiment of the present invention.

Referring to FIG. 3, a diagram is shown illustrating example components that may be employed by the base station 102 in processing a downlink signal 106 of the system 100. In general, the base station 102 may generate the downlink signal 106 that may be used, in one example, by mobile units 104. A channel 130 may be implemented, for example, as a wireless channel. In one example, the channel 130 may be implemented as a cellular communications channel (e.g., a 3GPP LTE network, etc.). In one example, the base station 102 may include a downlink processing component 140 and a radio interface component 142. The downlink processing component 140 may include the processor 110 of FIG. 2.

Figure 1:
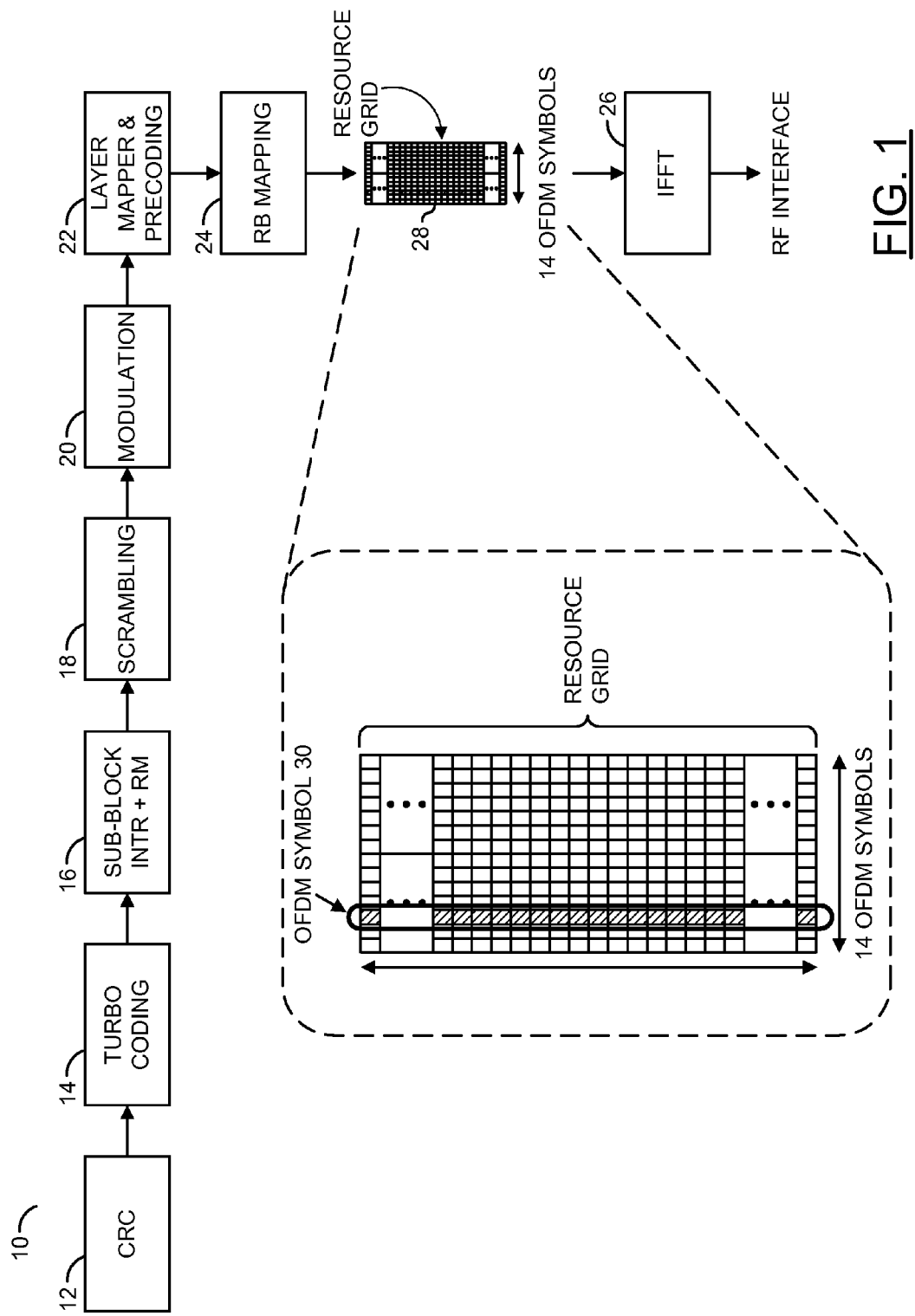
FIG. 1 is a diagram illustrating a conventional downlink process.
Figure 4:
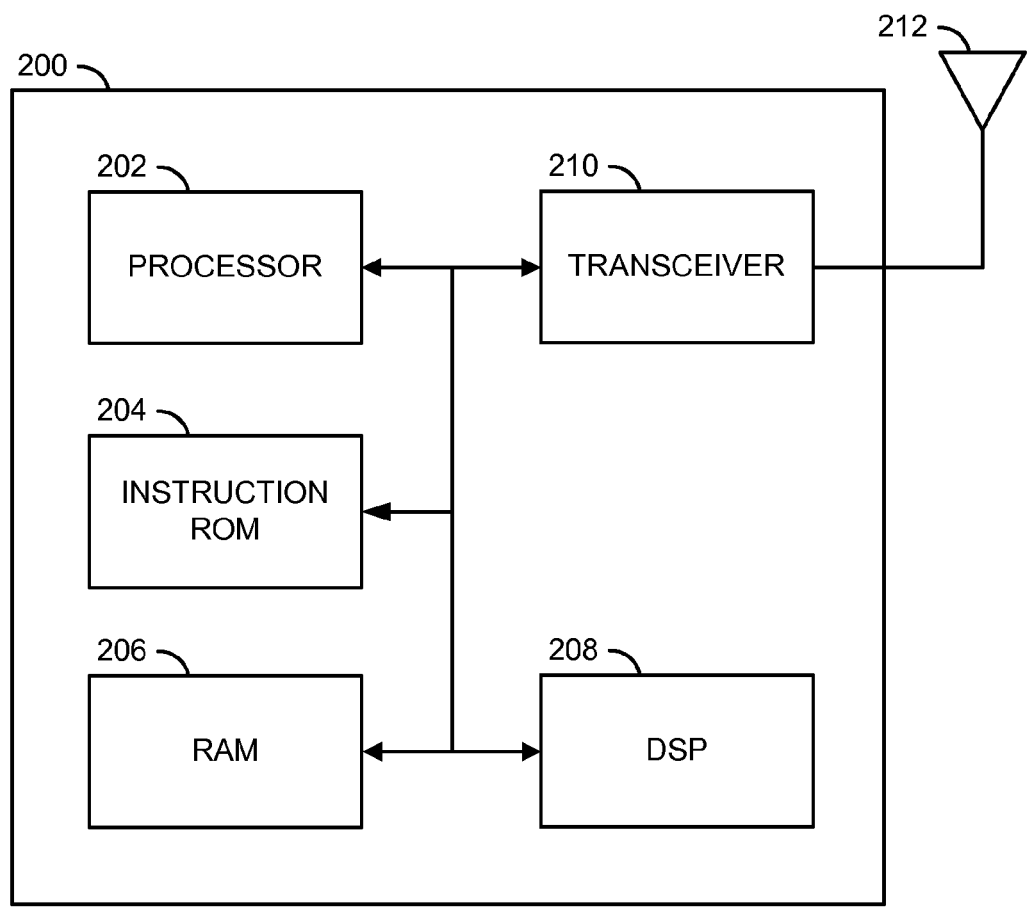
FIG. 4 is a diagram illustrating a processing unit in accordance with an example embodiment of the present invention.

Referring to FIG. 4, a block diagram is shown illustrating an example processing unit 200 that may be configured to implement resource elements mapping in accordance with a preferred embodiment of the present invention. In one example, the processing unit 110 of FIG. 1 may be implemented using the processing unit 200. The processing unit 200 may include, but is not limited to, a block (or module) 202, a block (or module) 204, a block (or module) 206, a block (or module) 208, a block (or module) 210, and a block (or module) 212. The block 202 may be implemented, in one example, as an embedded processor (e.g., ARM, etc.). The block 204 may be implemented as a read only memory (ROM). The block 206 may comprise random access memory (RAM). The block 208 may implement a digital signal processor (DSP). The block 210 may be implemented, in one example, as an analog/RF unit (e.g., a transceiver). In another example, the block 210 may implement a transmitter and a receiver that are separate. The block 212 may implement an antenna (e.g., a cellular antenna, etc.). The block 210 may be configured to transmit and receive information via the antenna 212. The blocks 202-210 may be connected together using one or more busses. In one example, the block 204 may store computer executable instructions for controlling the processor 202 and/or the processor 208 in accordance with the teachings presented herein.

Figure 5:
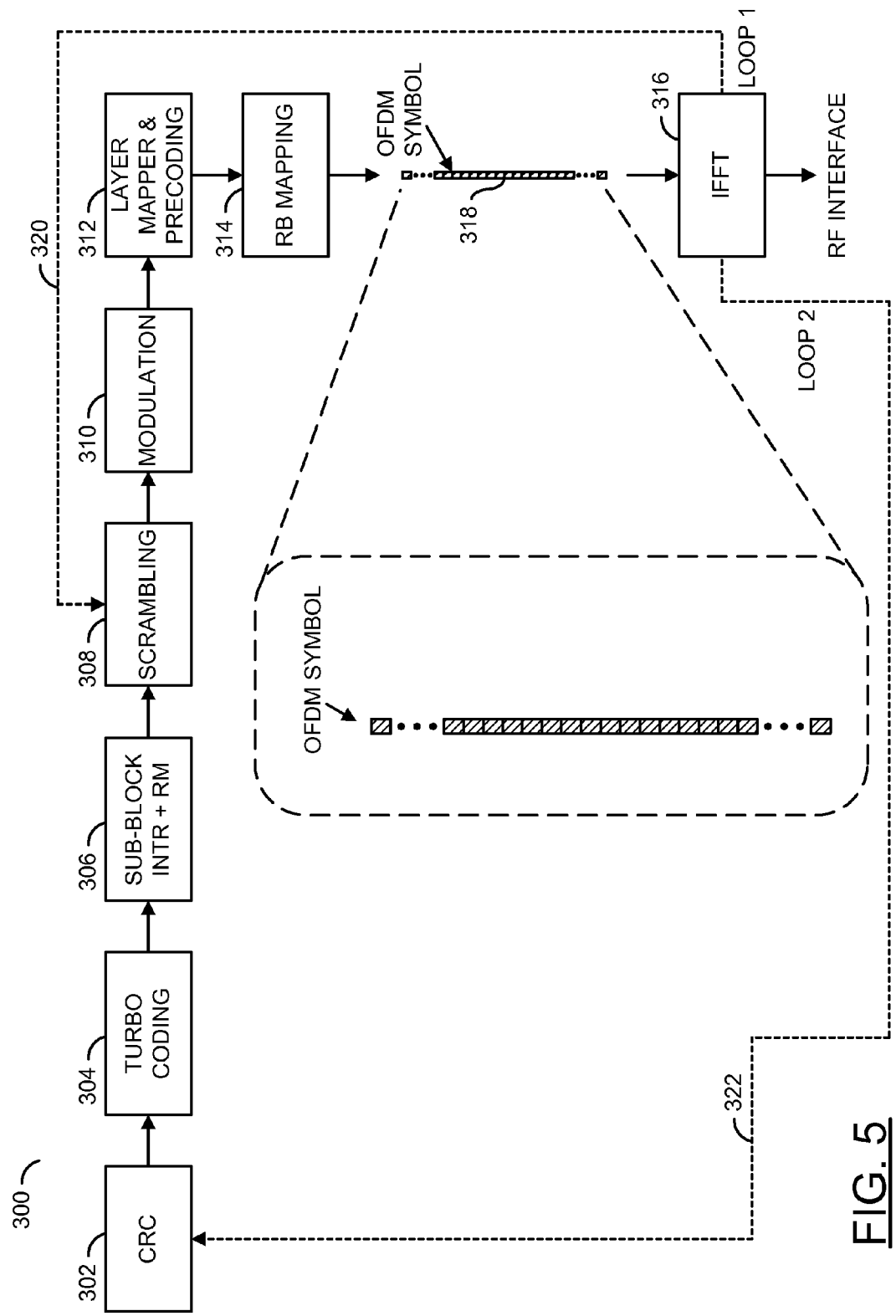
FIG. 5 is a flow diagram illustrating an example process in accordance with an example embodiment of the present invention.

Referring to FIG. 5, a flow diagram is shown illustrating a process 300 in accordance with an example embodiment of the present invention. The process 300 may implement an iterative downlink process for resource elements mapping on a pipe of orthogonal frequency division multiplexed (OFDM) symbols. The process (or method) 300 may comprise a step (or state) 302, a step (or state) 304, a step (or state) 306, a step (or state) 308, a step (or state) 310, a step (or state) 312, a step (or state) 314, and a step (or state) 316. The step 302 may comprise a cyclic redundancy check (CRC) generating process. The step 304 may comprise a turbo coding process. The step 306 may comprises a sub-block interleaving and rate matching process. The step 308 may comprise a scrambling process. The step 310 may comprise a modulation process. The step 312 may comprise a layer mapping and precoding process. The step 314 may comprise a resource block (RB) mapping process. The step 316 may comprise an inverse fast Fourier transform (IFFT) calculation process.

The cyclic redundancy check (CRC) generating process 302 generally produces several CRC parity bits. The resource block mapping process 314 generally produces a single orthogonal frequency division multiplexed (OFDM) symbol 318. A number of OFDM symbols 318 may be combined to form a resource grid similar to the resource grid 28 of FIG. 1. For example one OFDM symbol 318 may form a column in the resource grid. In one example, the resource grid may comprise a total of 14 columns in the case of a normal cyclic prefix (CP). However, other numbers of columns may be implemented accordingly (e.g., in the case of an extended CP) to meet the design criteria of a particular implementation. In general, the process 300 implemented in accordance with an example embodiment of the present invention does not wait until the resource grid is completely formed before performing the IFFT calculation process 316 for each OFDM symbol 318.

The process 300 generally begins in the step 302. In the step 302, the process 300 may generate several parity bits for an input sequence using, for example, a pre-determined cyclic generator polynomial. When the cyclic redundancy check (CRC) generating process 302 is complete, the process 300 may move to the step 304 to perform turbo coding on the data block to be transmitted to the mobile units 104. When the turbo coding process is completed, the process 300 may move to the step 306. In the step 306, the process 300 may perform sub-block interleaving and rate matching operations. When the sub-block interleaving and rate matching operations are completed, the process 300 may move to the step 308.

In the step 308, the process 300 generally performs a scrambling operation that may scramble the bits in accordance with the particular wireless communication standard being implemented. For example, the 3GPP LTE standard refers to performing scrambling on code words. However, the process 300 implemented in accordance with an example embodiment of the present invention generally performs scrambling on only part of the bits in each iteration. When the scrambling process is complete, the process 300 generally moves to the step 310. In the step 310, the process 300 generally modulates the block of scrambled bits. In one example, the block of scrambled bits may be modulated in accordance with section 7.1 of the 3GPP LTE Standard. For example, the modulation may use one of the modulation schemes presented in Table 6.3.2.-1 of the 3GPP LTE Specification. The modulation process generally results in a block of complex-valued modulation symbols. When the modulating operation is completed, the process 300 generally moves to the step 312.

In the step 312, the complex value modulation symbols generated in the step 310 for each of the code words to be transmitted are generally mapped onto one or more layers. The mapping may take into account whether the transmission will be performed using a single antenna port or multiple antenna ports. In one example, the modulated symbols may be mapped to layers according to one of sections 6.3.3.1 or 6.3.3.3 of the 3GPP LTE Multiplexing and Channel Coding Specification (3GPP TS 36.212 v10.1.0 (2010-3)). Following layer mapping the process 312 performs a precoding process. In one example, the precoding process takes an input block of vectors from the layer mapping and generates a block of vectors to be mapped onto resources on each of the one or more antenna ports. In one example, the precoding process performed in the step 312 may be compliant with the process described in section 6.3.4 of the 3GPP LTE Standard. When the layer mapping and precoding process has been completed, the process 300 may move to the step 314.

In the step 314, the process 300 generally maps the block of complex-valued symbols generated in the previous steps to resource elements (REs). In particular, the process 314 generally maps the complex-valued symbols to a single OFDM symbol. When the resource elements of the single OFDM symbol have been mapped, the process 300 generally moves to the step 316, where inverse fast Fourier transform processing is performed on the OFDM symbol. Upon completion of the inverse fast Fourier transform process 316, the process 300 may, in one example, return to the step 308 to begin processing a second OFDM symbol. In another example, the process 300 may return to the step 302 to begin processing the next OFDM symbol. Alternatively, the process 316 may include a decision process that may determine whether to return to the step 302 or the step 308 based upon predefined criteria (e.g., number of UEs, desired data rate, etc.). In one example, the process 316 may return to the process 308 via LOOP 1 (e.g., illustrated by line 320 in FIG. 5). In another example, the process 316 may return to the process 302 via LOOP 2 (e.g., illustrated by line 322 in FIG. 5).

The process in accordance with the present invention generally provides a solution for implementing resource elements mapping in a pipe of OFDM symbols in either a single or multi-user transmission. Instead of processing the whole data set and filling all of the resource blocks in the resource grid prior to IFFT processing, the process in accordance with the present invention generally begins IFFT processing as soon as the first OFDM symbol is ready for the RF interface. After processing one OFDM symbol, the processing of a downlink (DL) transmitter generally continues by processing the next OFDM symbols for the RF interface using an iterative process. By starting the IFFT process after filling only one OFDM symbol, the present invention may significantly reduce the latency between downlink layer 1 processing and the RF interface. In general, the system in accordance with the present invention reduces significantly the layer 1 DL latency by processing only the data that is mapped to one OFDM symbol in each iteration, instead of the implementation described in the 3GPP LTE standard.

In general, each block of the processing chain may be configured to process only the amount of data mapped to one OFDM symbol. Since there are a total of 14 OFDM symbols for a normal CP, the number of iterations in a transmission time interval (TTI) may be equal to 14. The IFFT is calculated for each iteration and as mentioned above, the latency is measured from the beginning of the CRC calculation until the first OFDM symbol is processed. The method in accordance with the present invention generally minimizes the latency because on the first iteration, the first OFDM symbol is processed, including IFFT.

In one example, the pipe of data for each OFDM symbol may be started with the scrambling block and the latency of the following blocks (e.g., scrambling, modulating, layer mapping and precoding, and RB mapping) may be reduced by a factor of 1/14 (one OFDM symbol out of 14 OFDM symbols in a TTI). In another example with a high data rate and small number of UEs (which is a common case), the pipe of data for each OFDM symbol may be started from the beginning of the DL processing (e.g., illustrated by the line 322 labeled LOOP 2 in FIG. 5). When the loop 322 is implemented, the latency of each block in the DL processing may be reduced by approximately a factor of 1/14 (one OFDM symbol out of 14 OFDM symbols in a TTI). In general, the latency may be reduced by more than 90%.

The process 300 may provide a solution for implementing resource elements mapping in a pipe of OFDM symbols in case of one or multi user transmission instead of processing the whole data and filling all the resource blocks into the resource grid. After processing one OFDM symbol, the processing performed by a DL transmitter in accordance with an embodiment of the present invention may continue with the next blocks until reaching the RF interface. Starting the IFFT calculation after filling one OFDM symbol may significantly reduce the latency between downlink layer 1 processing and the RF interface. Embodiments of the present invention may be implemented in both hardware (HW) and/or software (SW). Embodiments of the present invention may be implemented for all cases of LTE multi-antenna transmission. The proposed invention can generally be identified by determining that the IFFT processing on the DL data is already started before filling the whole resource grid with the resource block mapping in a given TTI.

The functions performed by the diagram of FIG. 5 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a radio frequency (RF) interface; and
   a processor configured to process downlink information such that a downlink data processing latency of said apparatus is determined by an amount of time involved in (i) processing the downlink information and mapping complex-valued modulation symbols for a single orthogonal frequency division multiplexed (OFDM) symbol onto resource elements of a respective antenna port and (ii) generating a complex-valued time-domain OFDM signal for the respective antenna port from the single OFDM symbol mapped onto the resource elements of the respective antenna port for presentation to the RF interface, wherein a processing chain of said processor is configured to process each OFDM symbol individually by scrambling coded bits in one or more code words to be transmitted on a physical channel, generating the complex-valued modulation symbols based upon the scrambled coded bits, mapping the complex-valued modulation symbols onto a transmission layer, precoding the complex-valued modulation symbols on the transmission layer for transmission on the respective antenna port, and mapping the precoded complex-valued modulation symbols onto the resource elements of the respective antenna port.

2. The apparatus according to claim 1, wherein said processor is configured to generate a complex-valued time-domain OFDM signal on each respective antenna port in response to complex-valued modulation symbols being mapped onto resource elements of each respective antenna port and said processor repeats the process individually for each of a plurality of OFDM symbols.

3. The apparatus according to claim 1, wherein said complex-valued time-domain OFDM signal is generated by inverse fast Fourier transform processing of the single OFDM symbol.

4. The apparatus according to claim 3, wherein said complex-valued time-domain OFDM signal is generated one OFDM symbol at a time for a plurality of OFDM symbols.

5. The apparatus according to claim 1, wherein said processing chain of said processor is further configured to process each OFDM symbol individually by performing one or more of cyclic redundancy check (CRC) generation, turbo coding, sub-block interleaving, and rate matching on said downlink information prior to scrambling the coded bits.

6. The apparatus according to claim 5, wherein said processes performed by said processing chain of said processor are iterated over a number of individual OFDM symbols until a complete resource grid has been inverse fast Fourier transformed one OFDM symbol at a time.

7. The apparatus according to claim 1, wherein said apparatus is part of a base station in a wireless communication system.

8. The apparatus according to claim 1, wherein said apparatus is part of an LTE cellular communication system.

9. A method of resource elements mapping with reduced downlink data processing latency comprising the steps of:
   (A) generating a single orthogonal frequency division multiplexed (OFDM) symbol from downlink information by scrambling coded bits in one or more code words to be transmitted on a physical channel, generating the complex-valued modulation symbols based upon the scrambled coded bits, mapping the complex-valued modulation symbols onto a transmission layer, precoding the complex-valued modulation symbols on the transmission layer for transmission on the respective antenna port, and mapping the precoded complex-valued modulation symbols onto the resource elements of the respective antenna port;
   (B) generating an inverse fast Fourier transform (IFFT) of said single OFDM symbol; and
   repeating steps A and B until a number of OFDM symbols making up a resource grid have been individually generated and transformed one OFDM symbol at a time.

10. The method according to claim 9, further comprising:
    presenting each transformed OFDM symbol to a radio frequency (RF) interface; and
    generating a downlink signal.

11. The method according to claim 9, further comprising:
    (C) generating a complex-valued time-domain OFDM signal on an antenna port from each individual OFDM symbol mapped onto resource elements of the resource grid for the respective antenna port one OFDM symbol at a time; and
    repeating step C as each of the individual OFDM symbols is mapped to the resource grid.

12. The method according to claim 9, wherein generating the one orthogonal frequency division multiplexed (OFDM) symbol at a time further comprises one or more of generating cyclic redundancy check (CRC) parity bits, performing turbo coding, performing sub-block interleaving, and performing rate matching prior to scrambling the coded bits.

13. The apparatus according to claim 1, wherein said apparatus reduces 3GPP LTE layer 1 downlink (DL) latency significantly by processing only the data that is mapped to one OFDM symbol in each of a number of iterations.

14. The apparatus according to claim 13, wherein the number of iterations in a transmission time interval (TTI) equals 14 for a normal cyclic prefix (CP).

15. An apparatus comprising:
    a radio frequency (RF) interface; and
    a processor configured to process downlink information such that a downlink data processing latency of said apparatus is determined by an amount of time involved in (i) processing the downlink information and mapping complex-valued modulation symbols for a single orthogonal frequency division multiplexed (OFDM) symbol onto resource elements of a respective antenna port and (ii) generating a complex-valued time-domain OFDM signal for the respective antenna port from the single OFDM symbol mapped onto the resource elements of the respective antenna port for presentation to the RF interface, wherein
    in a first mode, said processor processes each OFDM symbol individually by (i) scrambling coded bits in one or more code words to be transmitted on a physical channel, (ii) generating the complex-valued modulation symbols based upon the scrambled coded bits, (iii) mapping the complex-valued modulation symbols onto a transmission layer, (iv) precoding the complex-valued modulation symbols on the transmission layer for transmission on the respective antenna port, and (v) mapping the precoded complex-valued modulation symbols onto resource elements of the respective antenna port, and in a second mode said processor processes each OFDM symbol individually by performing cyclic redundancy check (CRC) generation, turbo coding, sub-block interleaving, and rate matching on said downlink information followed by (i) scrambling coded bits in one or more code words to be transmitted on a physical channel, (ii) generating the complex-valued modulation symbols based upon the scrambled coded bits, (iii) mapping the complex-valued modulation symbols onto a transmission layer, (iv) precoding the complex-valued modulation symbols on the transmission layer for transmission on the respective antenna port, and (v) mapping the precoded complex-valued modulation symbols onto resource elements of the respective antenna port prior to scrambling the coded bits.

16. The apparatus according to claim 15, wherein said processor is configured to select between said first mode and said second mode based upon one or more predefined criteria.

17. The apparatus according to claim 15, wherein said processor is configured to select between said first mode and said second mode based upon at least one of a number of mobile units (UEs) and a desired data rate.

* * * * *